April 28, 1970 C. W. EHRMAN 3,509,542

DIGITAL VECTOR GENERATOR

Filed Aug. 15, 1967 4 Sheets-Sheet 1

INVENTOR
CARL W. EHRMAN

BY Alfred E. Hall

ATTORNEY

X

April 28, 1970 C. W. EHRMAN 3,509,542

DIGITAL VECTOR GENERATOR

Filed Aug. 15, 1967 4 Sheets-Sheet 3

United States Patent Office 3,509,542
Patented Apr. 28, 1970

3,509,542

DIGITAL VECTOR GENERATOR

Carl W. Ehrman, Minneapolis, Minn., assignor to Sperry Rand Corporation, New York, N.Y., a corporation of Delaware Filed Aug. 15, 1967, Ser. No. 660,772
Int. Cl. G06f 7/02
U.S. Cl. 340—172.5 4 Claims

ABSTRACT OF THE DISCLOSURE

Method and apparatus for approximating a linear function of any slope by a series of digitally generated incremental segments of 0°, 45°, and 90°. The present position of the beam is stored in digital form in first and second registers. The increments to be added along both the X and Y axes are stored in digital form in third and fourth registers respectively. A counter, initially set to a predetermined value, is started counting. Each time the counter is incremented by one unit, it is scanned beginning with the least significant bit. The first counter bit found that is a "1" is compared with the corresponding most significant bit in the third and fourth registers. Thus, if at any count, the first "1" found in the counter is in the second least significant bit position, it is compared with the second most significant bit in the third and fourth registers. If only the third register has a "1" in that position, the beam is moved one unit along the X axis. If only the fourth register has a "1" in that position, the beam is moved one unit along the Y axis. If both the third and fourth registers have a "1" in that position, the beam is moved at an angle of 45° for one increment or unit as measured along either the X or Y axis. Thus, the linear function is approximated.

BACKGROUND OF THE INVENTION

The present invention relates to a method and apparatus for providing a relatively simple and inexpensive CRT vector display which approximates a linear function of any slope by a series of digitally generated incremental line segments of 0°, 45°, and 90°.

Display systems are becoming increasingly important in the computer industry through the use of alphanumeric and graphic inputs. Computer solutions of graphic problems require the use of a vector generator. Prior art vector generators which are used with high speed digital computers require expensive, high-precision linear amplifiers which have problems of stability and which require precise adjustment.

There exists, therefore, a need for a relatively simple and inexpensive CRT vector display which is digitally controlled. The present invention provides such a display provided that the requirement of speed is not important. Thus, while the present invention is simple and inexpensive, it does not have the speed of operation comparable to those display devices having the high precision linear amplifiers. However, there are many commercial applications where speed is not of paramount importance but where expense is detrimental to the use of such a display device.

SUMMARY OF THE INVENTION

The present invention is accomplished by having a first set of $n$-bit registers which store in digital form the Cartesian coordinate location of the present position or origin point of the beam, a second set of $n$-bit registers which store in digital form the number of increments ($\Delta X$, $\Delta Y$) the beam is to move in the X and Y directions from its present position and an $n$-bit counter which is preset to a predetermined value. The counter is then caused to be successively incremented until all $n$ stages are set. Each time the counter is incremented, a comparison is made of the output of the lowest order stage in the counter that has been set and the output of the corresponding highest order stage of the $\Delta X$ and $\Delta Y$-registers. If the lowest order stage of the counter that is set is denoted the $i$th stage, then the corresponding highest order stage of the $\Delta X$ and $\Delta Y$-registers is the $n-(i-1)$ stage. If the corresponding highest order stage of the $\Delta X$-register is set, the beam is moved one unit in the X direction. If the corresponding highest order stage of the $\Delta Y$-register is set, the beam is moved one unit in the Y direction. If the corresponding highest order stage of both the $\Delta X$ and the $\Delta Y$-registers are set, the beam is moved at an angle of 45° for one unit as measured along either the X or the Y-axis.

Thus, it is an object of the present invention to provide a digital vector generator which is relatively simple and inexpensive.

It is a further object of the present invention to provide a method and apparatus for approximating a linear function of any slope by a series of digitally generated incremental segments of 0°, 45°, and 90°.

It is still a further object of the present invention to provide a digitally controlled vector generator which does not require high-precision linear amplifiers.

BRIEF DESCRIPTION OF THE DRAWINGS

These and other more detailed and specific objects will be disclosed in the course of the following specification, reference being had to the accompanying drawings, in which.

DESCRIPTION OF THE PREFERRED EMBODIMENT

Figure 1:
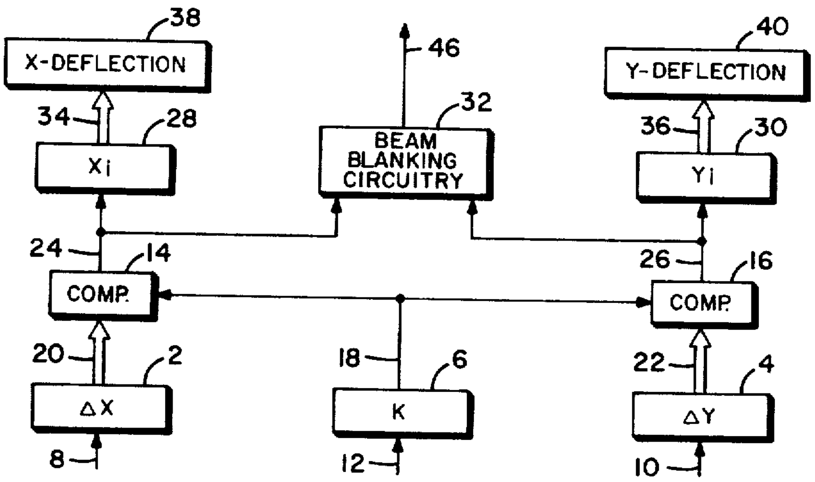
FIGURE 1 is a generalized block diagram of the invention.

A generalized block diagram of the implementation of the system is shown in FIG. 1. It can be seen that $\Delta X$-register 2, $\Delta Y$-register 4 and counter 6 (K), each of which is $n$-bits in length, receive their inputs on lines 8, 10 and 12 respectively. The data to be stored in digital form in the $\Delta X$-register 2 is the amount the beam is to move along the X-axis from its present position. Similarly, the data to be stored in digital form in the $\Delta Y$-register 4 is the amount the beam is to move along the Y-axis from its present position. The counter, K, will be set to a predetermined value as explained later. Each of the registers 2, 4 and 6 may have its input delivered to it on lines 8, 10 and 12 respectively from an input device such as, for example, a keyboard or a computer.

Comparator 14 receives the output of all stages of counter 6 through the lines of cable 18 as well as the output of all stages of the $\Delta X$-register through the lines of cable 20. The counter is then caused to be successively incremented until all $n$ stages are set. Each time the counter is incremented by one count, comparator 14 makes a comparison of the bit in the lowest order stage in the counter that has been set and the corresponding highest order stage of the ΔX-register 2. If the bits compare, an output is produced on line 24 which is used to increment the present X-position register in X control circuit 28, which, in turn, produces a digital output on the lines of cable 34 that is coupled to the X-deflection circuit 38. Deflection circuit 38 converts the digital data into analog data and drives the appropriate deflection coil.

Comparator 16 works in a similar manner to compare the outputs on cables 18 and 22 and produces an output on line 26 when a comparison is found. This output is used to increment the present Y-position register in Y control circuit 30 which, in turn, produces a digital output on line 36 that is coupled to the Y-deflection circuit 40. Circuit 40 converts the digital data into analog data and drives the Y-axis deflection coil via cable 36.

Beam blanking circuitry 32 receives the output of both of the comparators 14 and 16 and blanks the CRT beam when neither of the comparators produces an output.

Figure 2A:
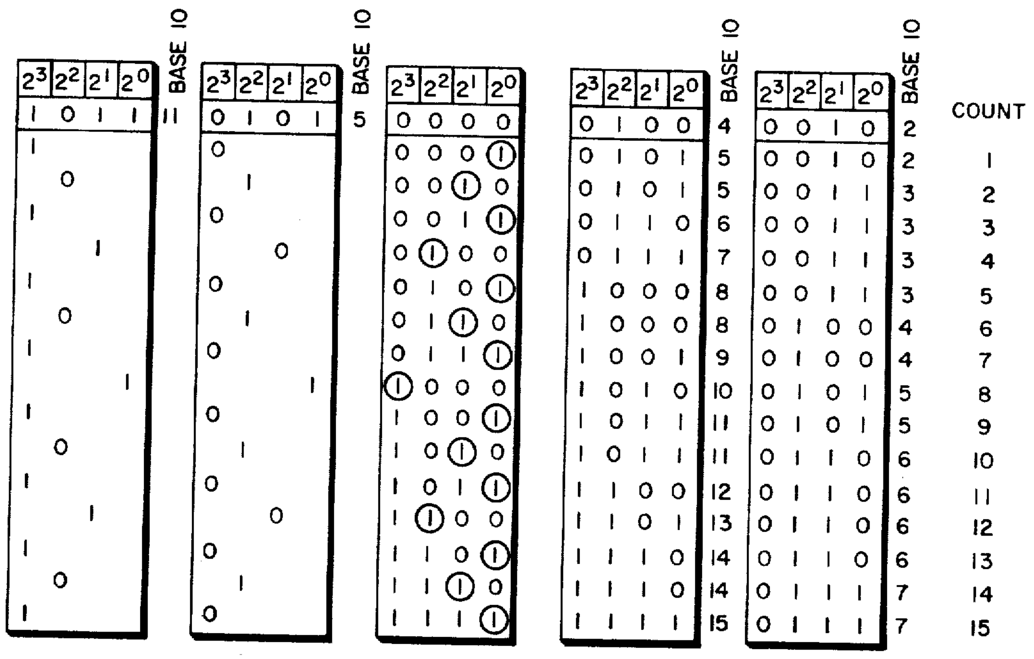
FIGURE 2*a* is a table showing the content of the various registers as the counter is incremented.

FIG. 2*a* is a table showing an example of the contents of the various registers as the counter is incremented. It is assumed, for purposes of the example only, that each of the registers stores 4 bits. As shown in the table in FIG. 2*a*, assume that the initial position of the beam along the X-axis as stored in the X-register in X-control circuit 28 is $0100=4_{10}$ and that the initial position of the beam along the Y-axis as stored in the Y-register in Y-control circuit 30 is $0010=2_{10}$. Assume also that all zeroes are stored in the counter, that the amount the beam is to be moved along the X-axis, and which is stored in the ΔX-register 2, is $1011=11_{10}$ and that the amount the beam is to be moved along the Y-axis, and which is stored in the ΔY-register 4, is $0101=5_{10}$. Assume that the counter is caused to be successively incremented one count at a time. At the first count, the counter stores $0001=1_{10}$. As shown in FIG. 2*a*, the lowest order bit of the counter, $2^0$, stores a "1." This bit, the bit to be compared and shown circled in each case in FIG. 2*a*, is compared with the corresponding highest order bit of both the ΔX and ΔY-registers. In this case, the highest order bit, $2^3$, of the ΔX-register is a "1" while the highest order bit, $2^3$, of the ΔY-register is a "0." Thus, there is a compare for the X-axis only and comparator 14 produces an output on line 24 which increments the X-register in X-control circuit 28 and, as shown in FIG. 2*a*, the count in the X-register changes from a 0100 to a 0101. The beam therefore moves one increment along the X-axis or at 0°.

At the second count, the counter stores $0010=2_{10}$ and the lowest order stage in the counter that stores a "1" is stage $2^1$. Similarly, the corresponding highest order stage of the ΔX and ΔY-registers is stage $2^2$. In this case, only the ΔY-register has a "1" in its corresponding highest order stage that compares with the "1" in stage $2^1$ of the counter. Thus, the beam moves one unit along the Y-axis or 90° since comparator 16 produces an output on line 26 which increments the Y-register in Y-control circuit 30 and, as shown in FIG. 2*a*, the count in the Y-register changes from a 0010 to a 0011.

At the third count, the counter stores $0011=3_{10}$ and the lowest order stage in the counter that stores a "1" is, once again, stage $2^0$. Thus, as stated above, only the highest order bit $2^3$ of the ΔX-register compares with the lowest order bit of the counter and, therefore, the beam is again moved one increment along the X-axis.

At the fourth count, the counter stores $0100=4_{10}$ and the lowest order stage in the counter that stores a "1" is stage $2^2$. The corresponding highest order stage of the ΔX and ΔY-registers is stage $2^1$. It can be seen from FIG. 2*a* that only the ΔX-register as a "1" in that position and thus the beam is moved one unit along the X-axis.

Counts 5, 6 and 7 are repeats of counts 1, 2 and 3 described above.

One count 8, however, the counter stores $1000=8_{10}$ and the lowest order stage in the counter that stores a "1" is stage $2^3$. The corresponding highest order stage of the ΔX-register and the ΔY-register is stage $2^0$. In this stage, both the ΔX and the ΔY-registers have a "1" stored which compares with the "1" in stage $2^3$ of the counter. Thus, the beam is moved at an angle of 45° with respect to the X or the Y-axis for one unit as measured along the X or Y-axis.

Each of the other remaining counts 9–15 is a repeat of one of the counts described above. It will be noticed that when the counter has a "1" stored in all of its stages, the X and Y-registers store a count indicating that the beam has reached its final position. Thus, this condition of all "1's" in the counter can be used to indicate when the counter should stop being incremented and is shown in the timing circuit in FIG. 6.

Figure 2B:
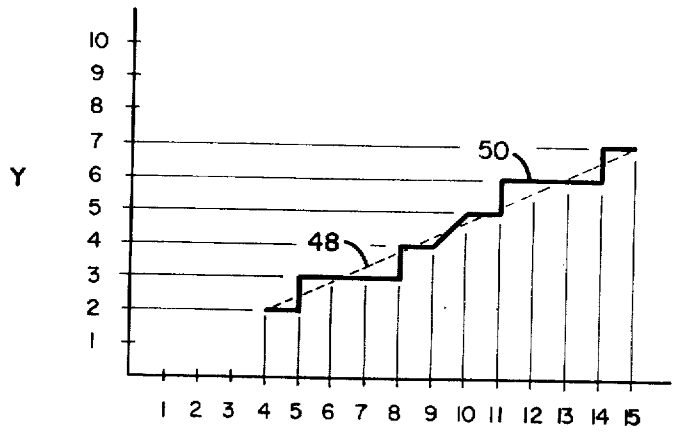
FIGURE 2*b* is a graph showing the resultant vector obtained with the values shown in FIGURE 2*a*.

The resultant vector obtained from the example above is shown in FIG. 2*b*. Line 48 indicates the ideal vector while line 50 indicates the actual vector as approximated by the circuitry. Note that the error of the trace shown in FIG. 2*b* is greatly exaggerated since X and Y movements are scaled at approximately ¼" per movement whereas the actual movements in a typical cathode ray tube device are on the order of 0.01 inch.

The foregoing implies a constant vector painting time equal to $2^{n-1}$ for an *n*-bit device regardless of the vector length if the values stored in the counter and the ΔX and ΔY-registers are not normalized. As will be discussed later, it is recognized that by presetting the counter and normalizing the ΔX and ΔY-registers or by forming a combination thereof, the vector painting time would be reduced such that it is always greater, although never more than twice as great, than the larger of ΔX or ΔY.

It should be noted that the invention is not restricted to binary (base 2) expressions of $f(x, y)$ but is valid for all linear functions $f(x, y)$ where:

$$(1)\quad f(x)=B^{n-1}a_x+B^{n-2}b_x+B^{n-3}c_x\ \ldots\ +Bj_x+k_x$$

and $$(2)\quad f(y)=B^{n-1}a_y+B^{n-2}b_y+B^{n-3}c_y\ \ldots\ +Bj_y+k_y$$

where B=any base and coefficients $a, b, c, \ldots j, k$ have values between and including 0 and $B-1$.

Figure 3:
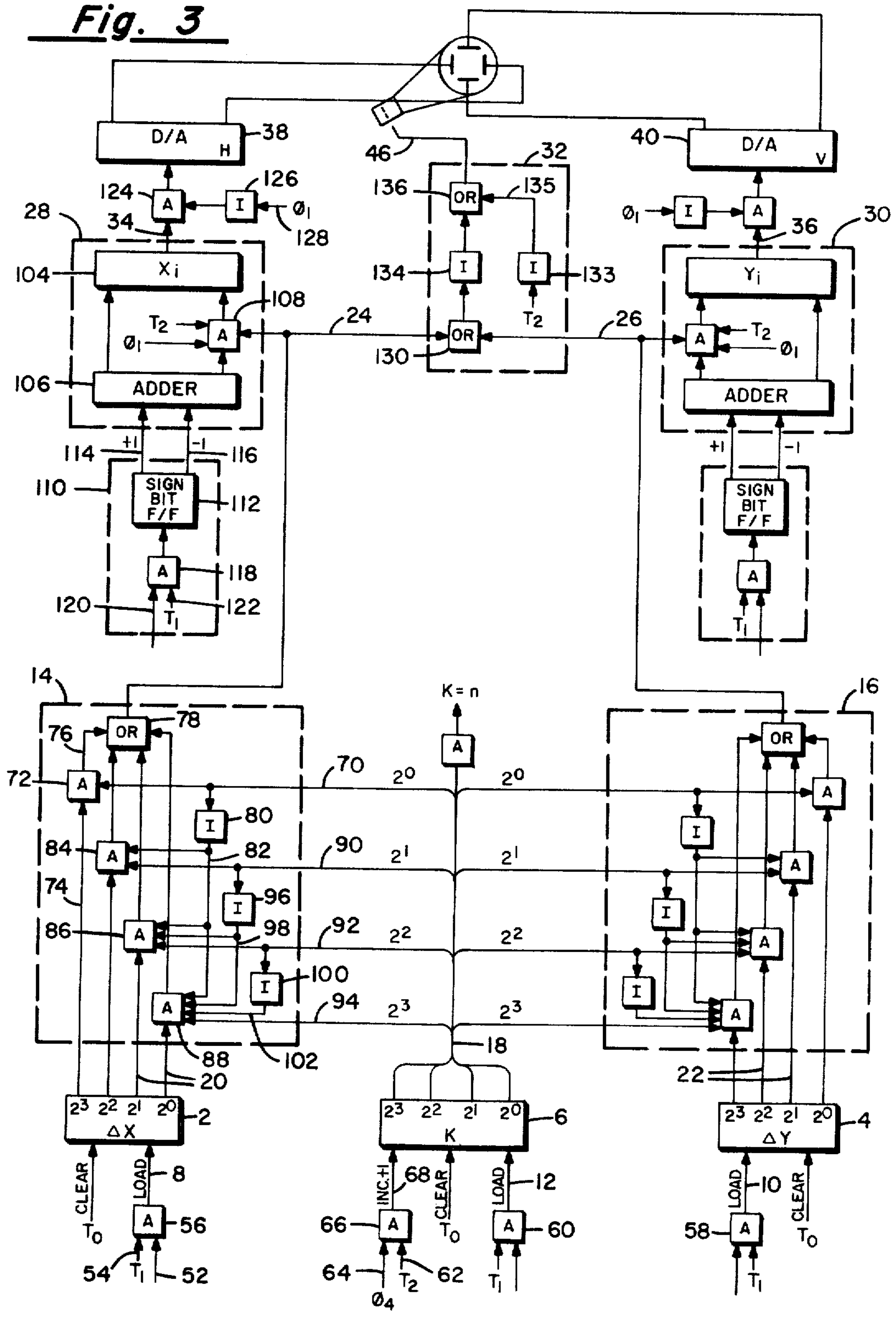
FIGURE 3 is a detailed block diagram of the inventive system.

The details of the inventive circuit are shown in FIG. 3 where like numerals indicate like elements in FIG. 1. Further, while only 4 bits are shown in each of the register of FIG. 3, it must be understood that they are *n*-bit registers.

Figure 6:
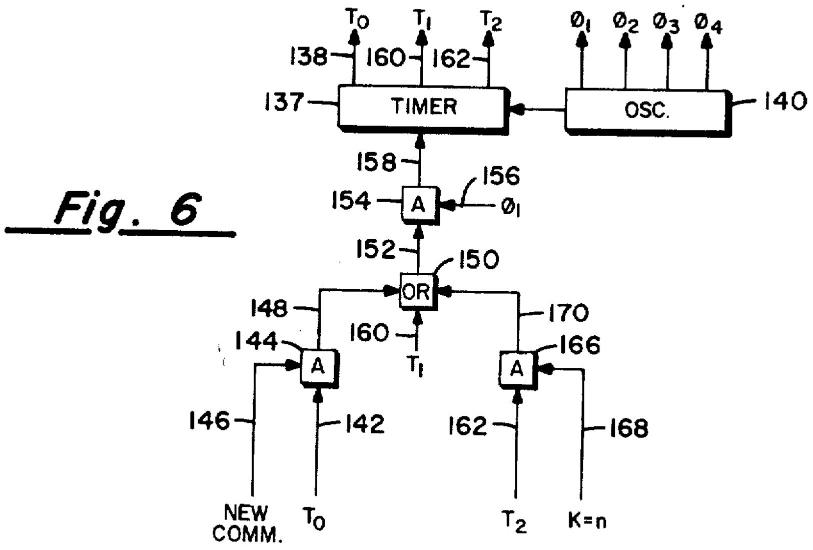
FIGURE 6 is a block diagram of the timer used to produce the timing cycles.
Figure 5:
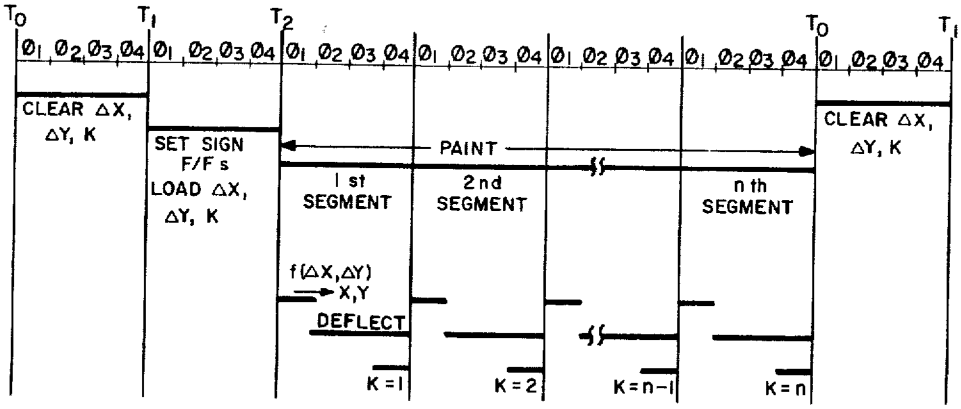
FIGURE 5 illustrates the timing cycles used by the present system.

As stated earlier, the ΔX and ΔY-registers 2 and 4 and the counter 6 may receive their inputs from an input device such as a keyboard or a computer. Thus, describing the input for one stage only, with the input data present on line 52 and timing pulse $T_0$ present on line 54, AND gate 56 produces an output on line 8 which is coupled to the proper stage in the ΔX-register 2. All of the remaining stages in the ΔX-register 2 are loaded in a similar manner. Likewise, the stages of the ΔY-register are loaded through a gate such as AND gate 58 while counter 6 stages are loaded through a gate such as AND gate 60. With the ΔX and the ΔY-registers loaded, they produce outputs on lines 20 and 22 respectively. The output of the counter 6 at this time, however, is a zero on the lines in cable 18. With timing pulse $T_3$ present on line 62 and timing pulse $\phi_4$ present on line 64, AND gate 66 produces an output on line 68 which increments the counter by one unit. The timing pulses are shown in FIG. 5 and the timing circuitry is shown in FIG. 6 and will be discussed later. With the counter 6 incremented by one unit, a "1" is present in stage $2^0$ and on one line in cable 18 and is coupled to both comparator units 14 and 16. Since these units are exactly the same, only unit 14 will be discussed in detail.

The "1" stored in stage $2^0$ of the counter 6 enters comparator unit 14 on line 70 and is coupled as one input to AND gate 72. If a "1" is also present from the X-register stage $2^3$ on line 74, AND gate 72 produces an output on line 76 which is coupled to OR gate 78. Thus, the lowest order stage of the counter is compared with the corresponding highest order stage of the ΔX-register. To insure that it is the lowest order stage having the "1" that is compared, all higher order stage comparisons are inhibited. Note in FIG. 3 that the signal on line 70 in comparison unit 14 is also coupled to an inverter 80 which, if a "1" is present at its input, produces a "0" at its output on line 82 which is coupled to AND gates 84, 86 and 88. Thus, these gates are inhibited to prevent any outputs therefrom even though counter 6 may have a "1" present in any one of stages $2^1$, $2^2$, or $2^3$.

If, however, stage $2^1$ of the counter is the lowest order stage storing a "1," then the "0" in stage $2^0$ inhibits AND gate 72 and causes inverter 80 to produce a "1" on its output line 82 which enables AND gate 84. At the same time, the "1" on line 90 from stage $2^1$ of the counter 6 provides the other enable to AND gate 84 and causes inverter 96 to produce an inhibit signal on line 98 which inhibits AND gates 86 and 88 and, thus, prevents any comparisons of higher order stages of the counter.

If stage $2^2$ is the lowest order stage of the counter that is storing a "1," then this signal is present on line 92 and cooperates with inverter 100 in a similar manner to that already described to inhibit AND gate 88.

If stage $2^3$ is the lowest order stage of the counter 6 that is storing a "1," then all the other stages are storing zeroes which cause inverters 80, 96 and 100 to produce enable signals on lines 82, 98 and 102 which cause AND gate 88 to produce an output signal if it has an input from stage $2^0$ of the ΔX-register 2.

Thus, it will be seen that comparison unit 14 allows only the lowest order stage of the counter that stores a "1" to be compared with the corresponding highest order stage of the X-register.

X and Y control circuits 28 and 30 are old and well known in the art. Circuit 28 consists merely of an X-position register 104 which stores the digital data representing the present beam position along the X-axis and an Adder 106 which is of the subtractive type whereby the incoming data on line 24 from comparator unit 14 to AND gate 108 may be either added to or subtracted from the information already stored in register 104.

To determine whether the input information on line 24 to the subtractive type adder should be added or subtracted, control circuit 110 is provided which comprises sign bit flip-flop 112 which produces a signal representing an addition on line 114 and a signal representing a subtraction on line 116. Flip-flop 112 is set or cleared depending upon the output of AND gate 118 which receives a sign bit on line 20 from the input device such as a computer. If timing pulse $T_2$ is simultaneously present on line 122, AND gate 118 produces an output which sets flip-flop to a state to indicate an addition or subtraction process.

The output of X-control circuit 28 on cable 34 is coupled to AND gate 124 which also receives the output of inverter 126. Whenever inverter 126 receives timing signal $\phi_1$ on line 128, the AND gate 124 is inhibited in order to prevent transfer of information from the X-control circuit to the *D/A* converters 38. This inhibition is necessary because the information from the comparator 14 is transferred to the X-control circuit during the occurrence of the $\phi_1$ timing signal and it is desired to wait until that transfer has been completed before transferring the information again into the *D/A* converters. The output of the *D/A* converters, of course, is coupled to the appropriate deflection coils of the CRT.

From the preceding example given in relation to the table shown in FIG. 2*a*, it is obvious that if the particular stage in both the X and Y-registers that are being compared are storing a "0," then the beam will not be moved at all. Thus, if the count stored in the counter is 0001, the count stored in the X-register is 0110 and the count stored in the Y-register is 0011, it will be observed that the highest order stage of both the X and the Y-registers contain a "0." Since no outputs will be produced by the comparison units 14 and 16, the beam will not move. This means that provision must be made whereby the beam can be blanked only when both comparator units 14 and 16 produce no outputs. Beam blanking control circuit 32 comprises an OR gate 130 which receives the outputs of the comparator circuits 14 and 16. If either of the outputs is a "1," OR gate 130 produces an output signal which is inverted by inverter 134 to produce a "0" and no blanking signal is applied to the CRT. However, if neither of the comparator units produce an output, OR gate 130 produces a "0" output which is inverted by inverter 134 to produce a "1" which passes through OR gate 136 and is coupled via line 46 to the control grid of the CRT to blank the electron beam. Beam blanking control circuit 32 thus prevents bright spots on the screen when the beam is not moving. Further since painting of the vector occurs only during time $T_3$, inverter 133 produces an output whenever pulse $T_3$ is not present. This output on line 135 blanks the CRT at that time.

Figure 4A:
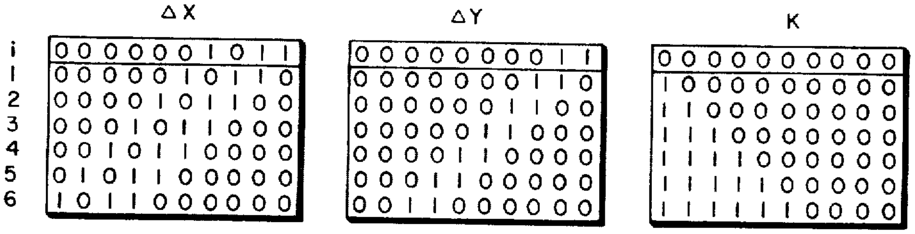
FIGURES 4*a* and 4*b* are a table showing the contents of the various registers when the contents thereof are normalized.

It will be seen that when the number of stages in the ΔX and ΔY-registers and the counter is large and the binary numbers stored in these registers and counter are small, the counter must run through a great number of counts before the beam will begin to move and the beam will be stationary for long periods of time between moves. For example, as shown in FIG. 4*a*, the ΔX value to be added to the initial beam position may be 0000001011 and the ΔY value to be added to the initial beam position may be 0000000011. This means that the counter must go through 64 counts before the first "1" in the highest order position is encountered and the beam can move. Further, between each move, the counter must count 64 counts before the beam can move again. This can be avoided by having the computer or other input device normalize the values to be stored in the ΔX, ΔY and counter registers. Thus, as shown in FIG. 4*a*, the ΔX and ΔY values are shifted left one place at a time and the value stored in the counter is shifted right one place at a time until the highest order "1" in the largest number, the ΔX value in this case, is in the highest order stage of that register.

Thus, the normalized value stored in the X-register is 1011000000 and the beam will begin to move with the first count of the counter. This operation, of course, would all take place in the computer prior to being transferred to the ΔX, ΔY and counter registers of the vector generator.

Figure 4B:
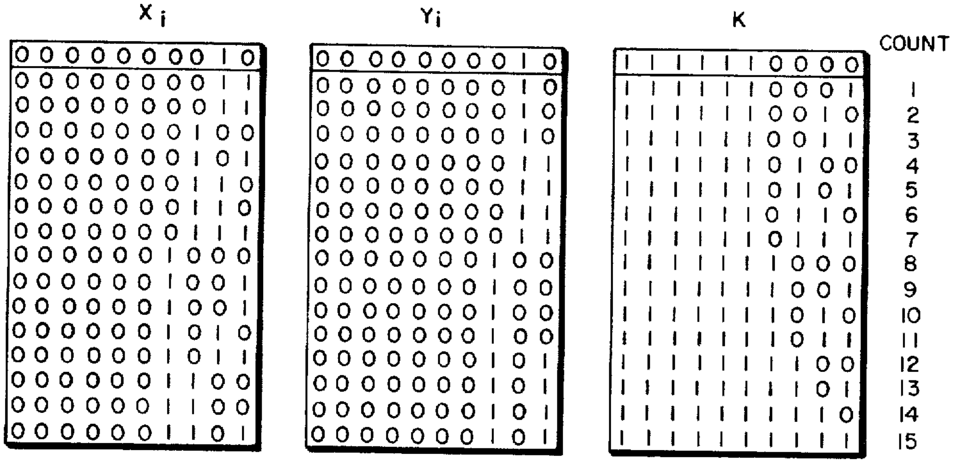

FIG. 4*b* shows the values stored in the X and Y-registers for each count of the counter as the normalized values stored in the ΔX and ΔY-registers are added to the initial beam position shown as 0000000010 for both the X and Y coordinates. It will be seen that with the stored value in the counter normalized, the vector will be completed when the counter has all stages storing a "1."

FIG. 5 shows the timing cycles used by the present system. There are three major cycles $T_0$–$T_2$ and four minor cycles $\phi_1$–$\phi_4$. The quiescent state occurs during cycle $T_0$. During major cycle $T_1$ the information from the computer or other input device is gated into the ΔX, ΔY and counter registers and the sign flip-flops are set. The painting of the vector occurs only during cycle $T_2$. During minor cycle $\phi_1$ of major cycle $T_2$ the result of the comparison of the lowest order stage of the counter having a "1" and the corresponding highest order stage of both the ΔX and ΔY-registers is transferred to X and Y control circuits 28 and 30 respectively. During minor cycles $\phi_2$, $\phi_3$ and $\phi_4$ of major cycle $T_2$ the deflection circuits are enabled and the beam can be moved. During each $\phi_4$ of major cycle $T_2$ the counter is incremented one count. Thus, the four minor cycles continue to repeat until the counter has a "1" in each stage. At that time the major cycle can change from $T_2$ to $T_0$. At time $T_0$ the $\Delta X$, $\Delta Y$ and counter registers are cleared and await the next inputs from the input device.

The circuitry for producing the necessary timing cycles is shown in FIG. 6. Assume that timer 137 is producing pulse $T_0$ on line 138 and that the four minor cycles are repeatedly produced by oscillator 140. Pulse $T_0$ will then be present on line 142 which is coupled to AND gate 144. When the new command signal is received on line 146 from the input device indicating that a vector is to be drawn, AND gate 144 produces an output on line 148 that is coupled to OR gate 150. The output of OR gate 150 on line 152 is coupled to AND gate 154. When the next $\phi_1$ signal is coupled to AND gate 154 via line 156, an output is produced on line 158 which causes timer 137 to produce timing pulse $T_1$ on line 160. Pulse $T_1$ is also coupled to OR gate 150 which again produces an output on line 152 that is coupled to AND gate 154. Again, when the next pulse $\phi_1$ is present on line 156, AND gate 154 will produce an output on line 158 that will cause timer 137 to produce pulse $T_2$ on line 162. When pulse $T_2$ is produced on line 164 by timer 137, it is also coupled to AND gate 166. It will be seen that AND gate 166 will not produce an output until a signal is present on line 168 which indicates that each stage of the counter is storing a "1." At that time, as explained previously, the vector has been painted and the painting cycle can be terminated. AND gate 166 will then produce an output on line 170 which passes through OR gate 150 and acts in the manner previously explained to cause timer 137 to produce pulse $T_0$ on line 172. The $\Delta X$, $\Delta Y$ and counter registers are cleared at this time. The timer then again awaits the new command signal on line 146 before the cycle can be repeated.

Thus, there has been disclosed a novel vector generator that is simple and inexpensive, which eliminates the need for expensive, high-precision linear amplifiers and which will approximate a linear function of any slope by a series of digitally generated incremental segments of 0°, 45° and 90°. It is obvious that the control circuits could be used with a mechanical vector generator.

What is claimed is:

1. The vector generator comprising:

(a) first and second registers each having $n$ bistable stages for receiving digital data representing the orthogonal components of a vector to be drawn;

(b) a binary counter having $n$ stages;

(c) comparing means coupled to said registers and said counter for comparing the $i$th stage of the counter with the $n-(i-1)$ stage of the first and second registers where $i$=the lowest order stage of the counter that is in a predetermined one of its two possible stable states for producing a first output signal when the $n-(i-1)$ stage of the first register stores the same binary value as the $i$th stage of said counter and a second output signal when the $n-(i-1)$ stage of the second register stores the same binary value as the $i$th stage of said counter;

(d) means including third and fourth registers adapted to store binary signals representing the coordinate location of the origin of the vector to be displayed;

(e) means for applying said first and second output signals to said third and fourth registers; and (f) means for successively incrementing said counter by one count until all $n$ stages of said counter are in said predetermined one of said stable states.

2. A vector generator as in claim 1 wherein said comparing means comprises:

(a) first and second groups of $n$ AND gates, the $i$th gate of each group receiving the output of the $i$th stage of the counter as an enable pulse, the output of the $n-(i-1)$ stage of the first and second registers respectively as an enable pulse and the inverted outputs of the $i-1$ preceding stages of the counter as inhibit pulses when any one of said $i-1$ preceding stages is producing an output signl, and (b) first and second OR gates for receiving the respective outputs of the first and second groups of AND gates and producing first and second outputs respectively representing one unit of length along said vector components.

3. A vector generator as in claim 2 further including:

(a) a CRT coupled to said OR gates and having an electron beam for drawing said vector, and (b) a beam blanking circuit coupled to said first and second OR gates and said CRT whereby said beam is blanked when neither of the OR gates produces an output signal.

4. Apparatus for drawing line segments having first and second Cartesian coordinate components on the surface of a medium, said apparatus comprising:

(a) writing means;

(b) first and second multi-stage registers coupled to said writing means for initially storing digital signals representing Cartesian coordinate locations of an origin point for a line segment to be drawn;

(c) third and fourth registers having plural stages for at least temporarily storing digital signals representing the length of the components of said line segment from said origin to a terminal point with respect to the Cartesian coordinate system;

(d) a first and second plurality of coincidence gates each having at least two input terminals and an output terminal;

(e) means connecting the first input terminal of each of said gates in said first plurality of gates to corresponding stages of said third register and the first input terminal of each of said gates in said second plurality of gates to corresponding stages of said fourth register;

(f) a binary counter connected to the second input terminals of each of said coincidence gates for enabling the transmission of a pulse of a given binary value from a predetermined one of said first input terminals in each of said first and second plurality of gates to a corresponding one of said output terminals in accordance with the output of the lowest order stage of said counter containing a given binary value; and (g) means connecting said output terminals to predetermined stages of said first and second registers for progressively updating the contents of said first and second registers in accordance with said signals representing the coordinates of the length of said line segment such that said writing means is caused to trace a line segment from said origin point to said terminal point.

References Cited

UNITED STATES PATENTS

| | | | |
|---|---|---|---|
| 3,305,843 | 2/1967 | Scuitto | 340—172.5 |
| 3,337,860 | 8/1967 | O'Hara | 340—324 |
| 3,430,207 | 2/1969 | Davis | 340—172.5 |

PAUL J. HENON, Primary Examiner

R. F. CHAPURAN, Assistant Examiner

U.S. Cl. X.R.

340—324